L. T. YOUNG.
DIRECTION INDICATOR FOR AUTOMOBILES.
APPLICATION FILED JUNE 26, 1917.

1,265,859.

Patented May 14, 1918.
2 SHEETS—SHEET 1.

INVENTOR
L. T. Young
BY
ATTORNEYS

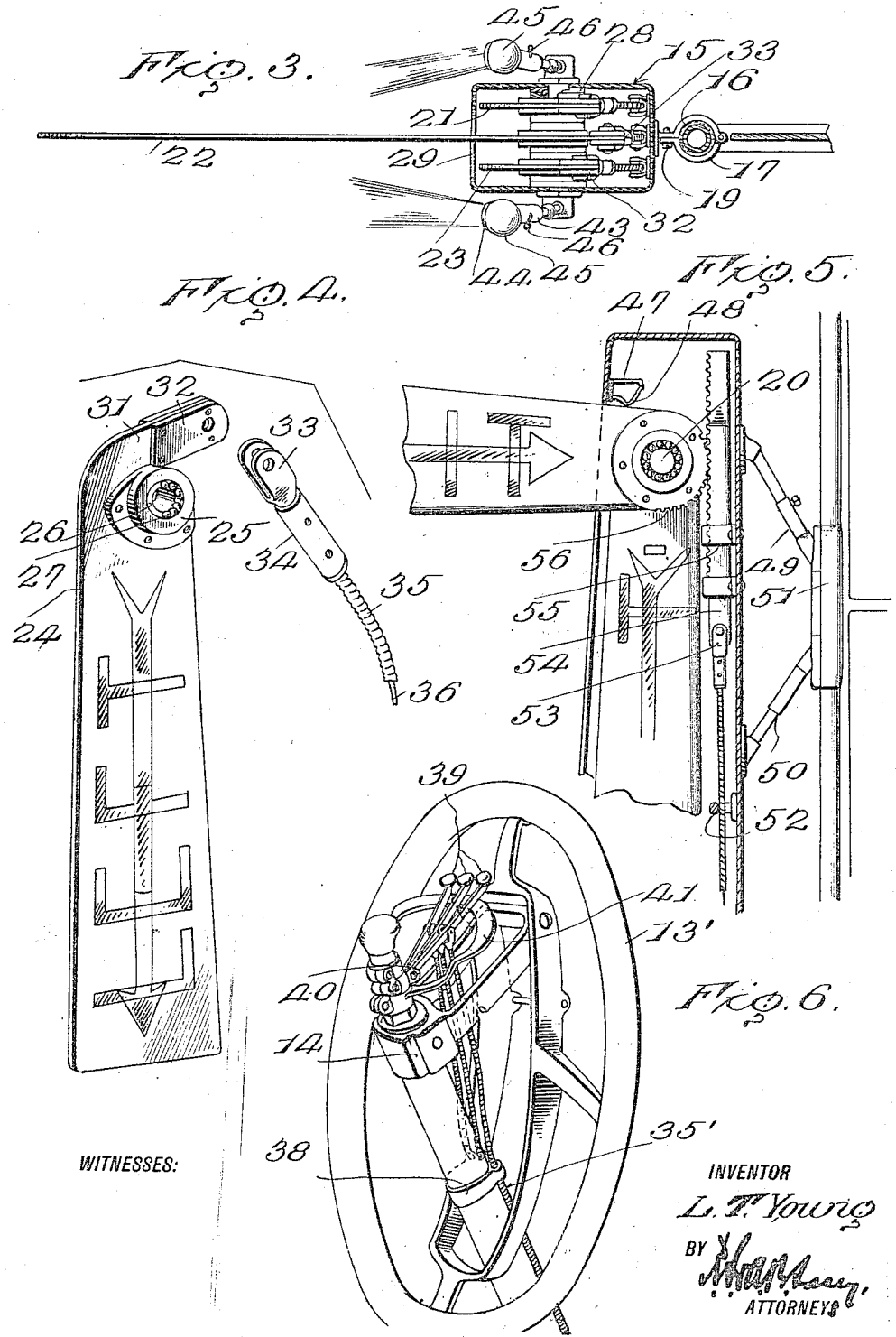

UNITED STATES PATENT OFFICE.

LEWIS T. YOUNG, OF MARION, OHIO.

DIRECTION-INDICATOR FOR AUTOMOBILES.

1,265,859.　　　　　Specification of Letters Patent.　　Patented May 14, 1918.

Application filed June 26, 1917.　Serial No. 177,043.

*To all whom it may concern:*

Be it known that I, LEWIS T. YOUNG, a citizen of the United States, residing at Marion, in the county of Marion and State of Ohio, have invented certain new and useful Improvements in Direction-Indicators for Automobiles, of which the following is a specification.

My invention relates to new and useful improvements in direction signals for vehicles, the primary object of my invention being the provision of a signal by means of which the driver of the vehicle, either by day or by night, may indicate an intent to turn in either direction or to stop.

A still further object of my invention resides in a signal of this character including a plurality of distinctly marked semaphore arms separately controlled by a plurality of levers which may be mounted upon the steering wheel of a motor vehicle and which have operative connection, by means of Bowden wires, with the semaphore arms or blades.

Another object which I have in view is the provision of an improved form of casing for normally housing the semaphore arms so arranged as to hold the arms against any rattling.

Still another object which I have in view is a novel means of swingingly mounting the arms so that they may be easily swung to active position by the levers and may swing to normal position by gravity.

In this connection, a further object of my invention resides in providing signal lights which are disposed to cast their rays upon the front and rear faces of any semaphore arm which is projected to active position and in arranging a circuit for the lights including a circuit closer which will be normally open and which will be closed upon projection of any one of the semaphore arms.

With these and other objects in view my invention will be more fully described, illustrated in the accompanying drawings, and then specifically pointed out in the claims which form a part of this application.

In the drawings:

Fig. 3 is a horizontal sectional view taken on the line 3—3 of Fig. 2 looking in the direction of the arrows;

Fig. 4 is an unassembled perspective view of one of the semaphore arms and the link by which it is connected to the Bowden wire;

Fig. 5 is a fragmentary view corresponding to Fig. 2 and illustrating a somewhat modified form of construction;

Fig. 6 is a perspective view showing the controlling levers mounted upon the steering column of the vehicle.

Figure 1:
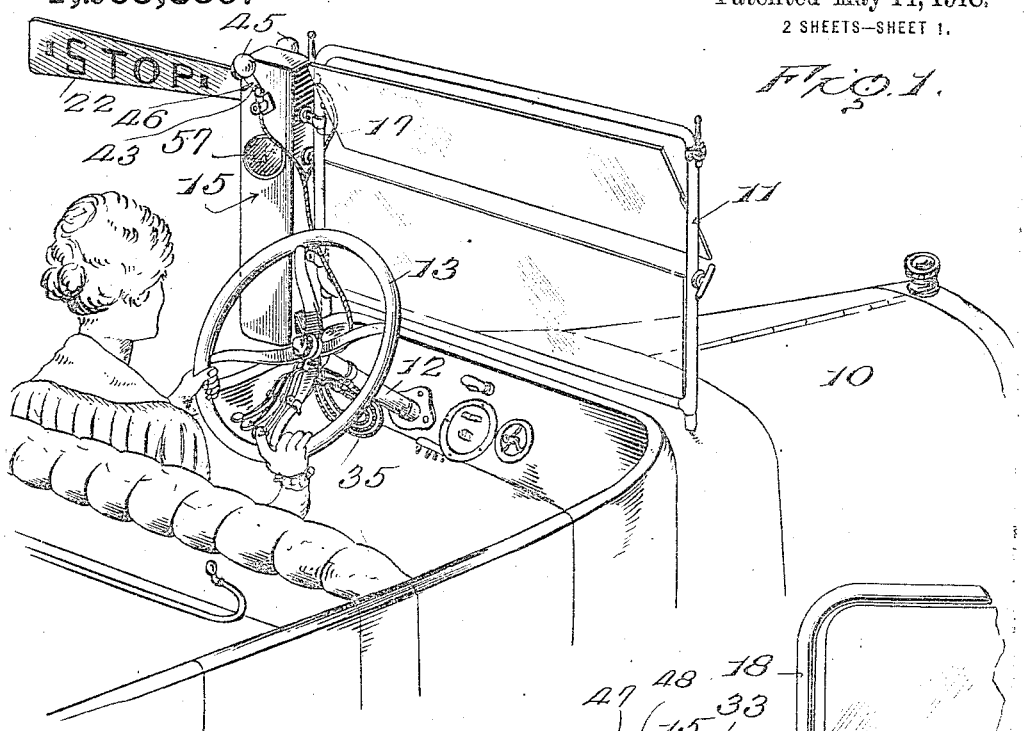
Figure 1 is a fragmentary perspective view of a motor vehicle with my direction signal attached.
Figure 2:
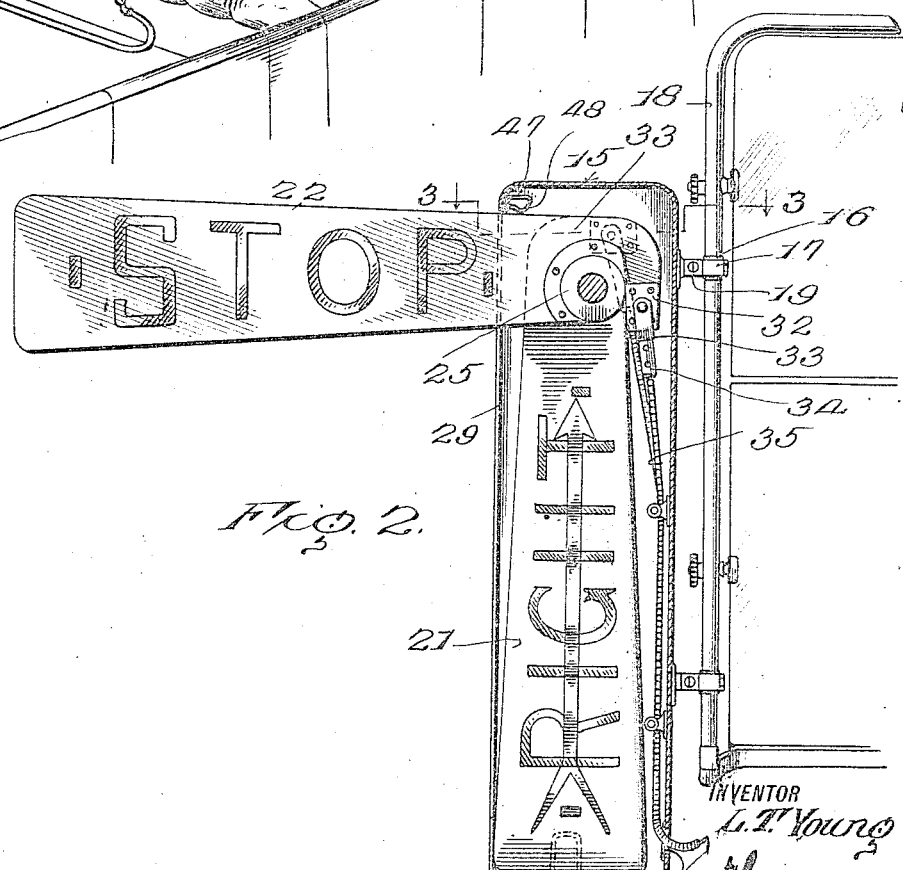
Fig. 2 is a vertical sectional view taken through the signal casing showing one of the signals in active position.

In order to insure a clear and accurate understanding of my invention I have illustrated it in connection with a conventional form of motor vehicle 10 having the usual wind shield 11, steering column 12, and a steering wheel 13, which may be of the usual type or which may be of a type shown at 13′ in Fig. 6 which is swingingly mounted upon a head 14 attached to the steering column.

Secured to the left hand side of the wind shield is the casing 15 of my improved signal, this casing being substantially rectangular in shape and vertically disposed. Brackets 16 secured to the inner side of the casing and having hinged clamping plates 17 engage about the frame 18 of the wind shield and bolts 19 secure the brackets thereto. A shaft 20 is fixed in the front and rear walls of the casing adjacent its upper end and carries a plurality of semaphore arms 21, 22, and 23. Each of these semaphore arms includes a blade 24, preferably formed of aluminium or other sheet metal, japanned, painted or otherwise protected and ornamented, fixed between sectional hub members 25, which in their outer faces are formed with grooves 26 to receive ball bearings 27. It will, therefore, be clear that ball races are provided between the intermediate hub and adjacent hubs and collars 28 correspondingly grooved coöperate with the outer hubs to form bearing races as well shown in Fig. 3. Inscribed upon both faces of one of the blades is a suitable signal such as the word "Stop," while inscribed upon both faces of another blade is a suitable signal such as the word "Left," while inscribed upon the other blade is a signal such as the word "Right." Preferably the blades inscribed with the words "Left" and "Right" are also inscribed with arrows pointing in the direction indicated by the words.

The outer face of the casing or housing 15 is formed with a slot 29 through which the blades may be swung when they have turned about the shaft 20 and the bottom wall of the housing has spaced upwardly directed resilient fingers 30 between which the lower ends of the blades engage when they are disposed within the housing so that they will be held against rattling. Each of the blades adjacent its hub is provided with a laterally directed arm 31 which preferably carries bracing strips 32. A coupling link 33 is pivoted to the free end of each arm 32 and projects into a reinforcing sleeve 34. The housing 35 of a Bowden wire 36 is connected to the free end of the sleeve and the wire 36 is connected to the free end of the link 33 so that strain exerted upon the wire may draw the link into the sleeve and cause swinging of the attached semaphore arm to horizontal position. These Bowden wires from the various semaphore arms run through the bottom of the casing as shown at 37 and are led up the steering column, being attached thereto by one or more clamp bands 38. A plurality of levers 39 are pivoted, as shown at 40, to the upper portion of the steering column above the wheel and rest upon the notched segment 41 of the throttle and spark levers at a point where they will not interfere with normal use of such levers. The control levers 39 are adapted for vertical swinging movement and are connected to the ends of the Bowden wires 36. It will, therefore, be seen that lifting of any one of the levers 39 will cause projection of the corresponding semaphore arm and that when such lever is released and pressed downwardly the arm will be forced back into the casing both by the action of the wire and by gravity.

Carried by the extended ends of the shaft 20 are light fixtures 43 which carry electric lamps 44 having reflectors 45. These lights and their reflectors are so arranged as to cast their rays upon the front and rear faces of any semaphore arm which may be in active position. The fixtures preferably inclose switches 46 by which the current may be shut off during the day time and a circuit breaker including the insulated spring contacts 47 and 48 is mounted in the casing to control the signal at night. These spring contacts are normally spaced from each other but are so proportioned and arranged that the movement of any semaphore arm to active position will force the contact 48 into engagement with the contact 47.

From the foregoing description the manner of employing my improved signal will be readily understood and any further explanation is believed to be unnecessary.

If desired certain modifications in construction may be made without in any way departing from the spirit of my claims and I reserve the right to make any such changes. For instance, as shown in Fig. 6, a bracket 49 may be provided and arranged to hold the casing in spaced relation from the side frame of the wind shield, this bracket including the converging arms 50 carried by the casing and the clamping sleeves 51 engaging the frame of the wind shield. Furthermore, if desired the Bowden wires which in any event are preferably supported by guides 52 may be connected by links 53 corresponding to the links 33 to the lower ends of rack bars 54 slidable in guides 55 carried by the casing. Under these circumstances the inner or upper ends of the semaphore blades, as well as the hubs, are formed circular and concentric with the shaft 20 and the hubs are formed with teeth 56 meshing with the teeth of the rack bars 54. Obviously, the operation of this signal is the same as that of the signal in which the Bowden wires are connected directly to lateral arms of the semaphore blades. The rear face of the housing preferably carries a mirror 57 in which the driver of the vehicle may observe traffic at the rear.

If desired the bracket arms 50 may be made in telescoping sections so that they may be adjusted longitudinally to permit application of the bracket to vehicles of different types. Of course, it will also be understood that the signal may be mounted in any suitable part of the vehicle and that the controlling levers instead of being mounted on the steering wheel may be secured to the dash or other part of the vehicle.

Having thus described the invention, what is claimed as new is:

1. A direction signal including a housing formed in one side with a slot, a shaft fixed in the housing with its ends projecting through the walls thereof, a plurality of semaphore arms swingingly supported upon the shaft and projectable through slots formed in the housing, means for selectively swinging the semaphore arms to project them from the housing, and a pair of lights supported by the ends of the shaft to direct their rays one against the front face and the other against the rear face of any projected arm.

2. A direction signal including a housing, a plurality of semaphore arms selectively projectable from the housing, a pair of signal lights with a common circuit carried by the housing to direct their rays against opposite sides of a projected semaphore arm, and means controlling the light circuit capable of being actuated by the projection of any arm to close the circuit.

In testimony whereof I affix my signature.

LEWIS T. YOUNG. [L. S.]